United States Patent
Thantharate et al.

(10) Patent No.: US 10,241,641 B1
(45) Date of Patent: Mar. 26, 2019

(54) NOTIFICATION OF A WIRELESS LOCAL AREA NETWORK BY A BROWSER APPLICATION OF A WIRELESS COMMUNICATION DEVICE

(71) Applicant: Sprint Communications Company L.P., Overland Park, KS (US)

(72) Inventors: Anurag Thantharate, Kansas City, MO (US); Hannah Jo Sifuentes, Raytown, MO (US); John Eric Belser, Olathe, KS (US); Do Kyu Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 707 days.

(21) Appl. No.: 14/252,362

(22) Filed: Apr. 14, 2014

(51) Int. Cl.
*H04W 36/14* (2009.01)
*H04W 48/16* (2009.01)
*G06F 3/0481* (2013.01)

(52) U.S. Cl.
CPC .............................. *G06F 3/04817* (2013.01)

(58) Field of Classification Search
CPC ..... H04W 84/12; H04W 88/06; H04W 28/18; H04W 4/02; H04W 48/18; H04W 48/16; H04W 36/14; H04M 2250/06; H04M 1/72519; H04M 2215/2033
See application file for complete search history.

(56) References Cited

U.S. PATENT DOCUMENTS

| | | | | |
|---|---|---|---|---|
| 2010/0088367 A1* | 4/2010 | Brown | ...................... | G06F 8/60 709/203 |
| 2010/0302958 A1* | 12/2010 | Wietfeldt | ............ | H04W 76/025 370/252 |
| 2011/0090794 A1 | 4/2011 | Cherian et al. | | |
| 2011/0177805 A1* | 7/2011 | Maki | ..................... | H04W 76/12 455/422.1 |
| 2011/0314129 A1* | 12/2011 | Rezaiifar | ............... | H04W 76/15 709/218 |

(Continued)

FOREIGN PATENT DOCUMENTS

EP 2589168 1/2012
WO 2010121191 10/2010

(Continued)

*Primary Examiner* — Sang H Kim

(57) ABSTRACT

A wireless communication device may be operated to facilitate directing user applications to use WLAN data connections. One of the user applications generates an application request for a URI, and a browser application requests a translation of the URI into an IP address. An LTE transceiver exchanges wireless data with an LTE network to translate the URI into the IP address. A WLAN transceiver detects a WLAN data connection. The browser application identifies that the LTE transceiver is exchanging wireless data with the LTE network and that the WLAN data connection is detected, and responsively processes a WLAN identifier for the WLAN data connection and an application identifier for the user application to determine if a user WLAN notice should be presented. If the WLAN notice should be presented, the browser application generates the user WLAN notice. The user WLAN notice is displayed to the user on a graphical display.

2 Claims, 5 Drawing Sheets

(56) References Cited

U.S. PATENT DOCUMENTS

| | | | |
|---|---|---|---|
| 2012/0198084 A1* | 8/2012 | Keskitalo | H04L 67/02 709/228 |
| 2013/0097329 A1* | 4/2013 | Alex | H04L 61/1511 709/228 |
| 2013/0097638 A1 | 4/2013 | Tanner | |
| 2013/0142050 A1 | 6/2013 | Luna | |
| 2013/0145017 A1 | 6/2013 | Luna | |
| 2013/0242964 A1* | 9/2013 | Hassan | H04W 48/18 370/338 |
| 2015/0033300 A1* | 1/2015 | Timariu | H04L 63/168 726/5 |
| 2015/0305070 A1* | 10/2015 | Ahmad | H04W 76/14 370/338 |
| 2016/0057696 A1* | 2/2016 | Montemurro | H04L 63/083 370/338 |

FOREIGN PATENT DOCUMENTS

| | | |
|---|---|---|
| WO | 2012001137 | 1/2012 |
| WO | 2013085590 | 6/2013 |

\* cited by examiner

NOTIFICATION OF A WIRELESS LOCAL AREA NETWORK BY A BROWSER APPLICATION OF A WIRELESS COMMUNICATION DEVICE

TECHNICAL BACKGROUND

To establish a communication session with a wireless access network, a user operates a wireless communication device to communicate in a wireless protocol with a wireless access node. Once the communication session is established, the wireless access node exchanges the user communications with other systems and communication networks in order to provide a communication service, such as telephony voice communications or data access over the Internet. The user typically operates the wireless communication device by interacting with a user interface of the device. The user may operate the wireless communication device to execute various user applications installed on the device, such as streaming media applications, video applications, audio applications, news clients, gaming applications, social media applications, sports applications, web browsers, messaging applications, and other software applications.

Some wireless communication devices are capable of communicating with different types of wireless communication networks using various wireless communication protocols. For example, a wireless communication device may be capable of communicating with both a long term evolution (LTE) wireless network and a wireless local area network (WLAN) wireless network. Such communication devices typically register with a serving enhanced Node B (eNodeB) base station to engage in an LTE communication session with the LTE wireless network, but may also connect to a WLAN by communicating with a wireless access point (WAP) using Wi-Fi or similar WLAN wireless protocols.

OVERVIEW

A method of operating a wireless communication device to facilitate directing user applications to use wireless local area network (WLAN) data connections is disclosed. The method comprises, in one of the user applications, generating an application request for a uniform resource identifier (URI). The method further comprises, in a browser application, requesting a translation of the URI into an internet protocol (IP) address. The method further comprises, in a long term evolution (LTE) transceiver, exchanging wireless data with an LTE network to translate the URI into the IP address and to communicate with the IP address. The method further comprises, in a WLAN transceiver, detecting one of the WLAN data connections. The method further comprises, in the browser application, identifying that the LTE transceiver is exchanging the wireless data with the LTE network and that the one of the WLAN data connections is detected, and in response, processing a WLAN identifier for the one of the WLAN data connections and an application identifier for the one of the user applications to determine if a user WLAN notice should be presented. The method further comprises, in the browser application, generating the user WLAN notice for the user responsive to determining that the user WLAN notice should be presented. The method further comprises, in a graphical display, displaying the user WLAN notice to the user.

A computer apparatus to operate a wireless communication device to facilitate directing user applications to use wireless local area network (WLAN) data connections comprises software instructions and at least one non-transitory computer-readable storage medium storing the software instructions. The software instructions are configured, when executed by the wireless communication device, to direct the wireless communication device to execute one of the user applications to generate an application request for a uniform resource identifier (URI) and execute a browser application to request a translation of the URI into an internet protocol (IP) address. The software instructions are further configured to direct the wireless communication device to direct a long term evolution (LTE) transceiver to exchange wireless data with an LTE network to translate the URI into the IP address and to communicate with the IP address, and direct a WLAN transceiver to detect one of the WLAN data connections. The software instructions are further configured to direct the wireless communication device to execute the browser application to identify that the LTE transceiver is exchanging the wireless data with the LTE network and that the one of the WLAN data connections is detected, and in response, process a WLAN identifier for the one of the WLAN data connections and an application identifier for the one of the user applications to determine if a user WLAN notice should be presented. The software instructions are further configured to direct the wireless communication device to execute the browser application to generate the user WLAN notice for the user responsive to determining that the user WLAN notice should be presented. The software instructions are further configured to direct the wireless communication device to direct a graphical display to display the user WLAN notice to the user.

A wireless communication device to facilitate utilization of wireless local area network (WLAN) data connections comprises a processing system, a long term evolution (LTE) transceiver, a WLAN transceiver, and a graphical display. The processing system is configured to execute a browser application, wherein the browser application is configured, when executed by the processing system, to receive a request for a uniform resource identifier (URI) and responsively request a translation of the URI into an internet protocol (IP) address. The LTE transceiver is configured to exchange wireless data with an LTE network to translate the URI into the IP address and to communicate with the IP address. The WLAN transceiver is configured to detect one of the WLAN data connections. The browser application is further configured, when executed by the processing system, to identify that the LTE transceiver is exchanging the wireless data with the LTE network and that the one of the WLAN data connections is detected, and in response, process a WLAN identifier for the one of the WLAN data connections and the IP address to determine if a user WLAN notice should be presented, and generate the user WLAN notice for the user responsive to determining that the user WLAN notice should be presented. The graphical display is configured to display the user WLAN notice to the user.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
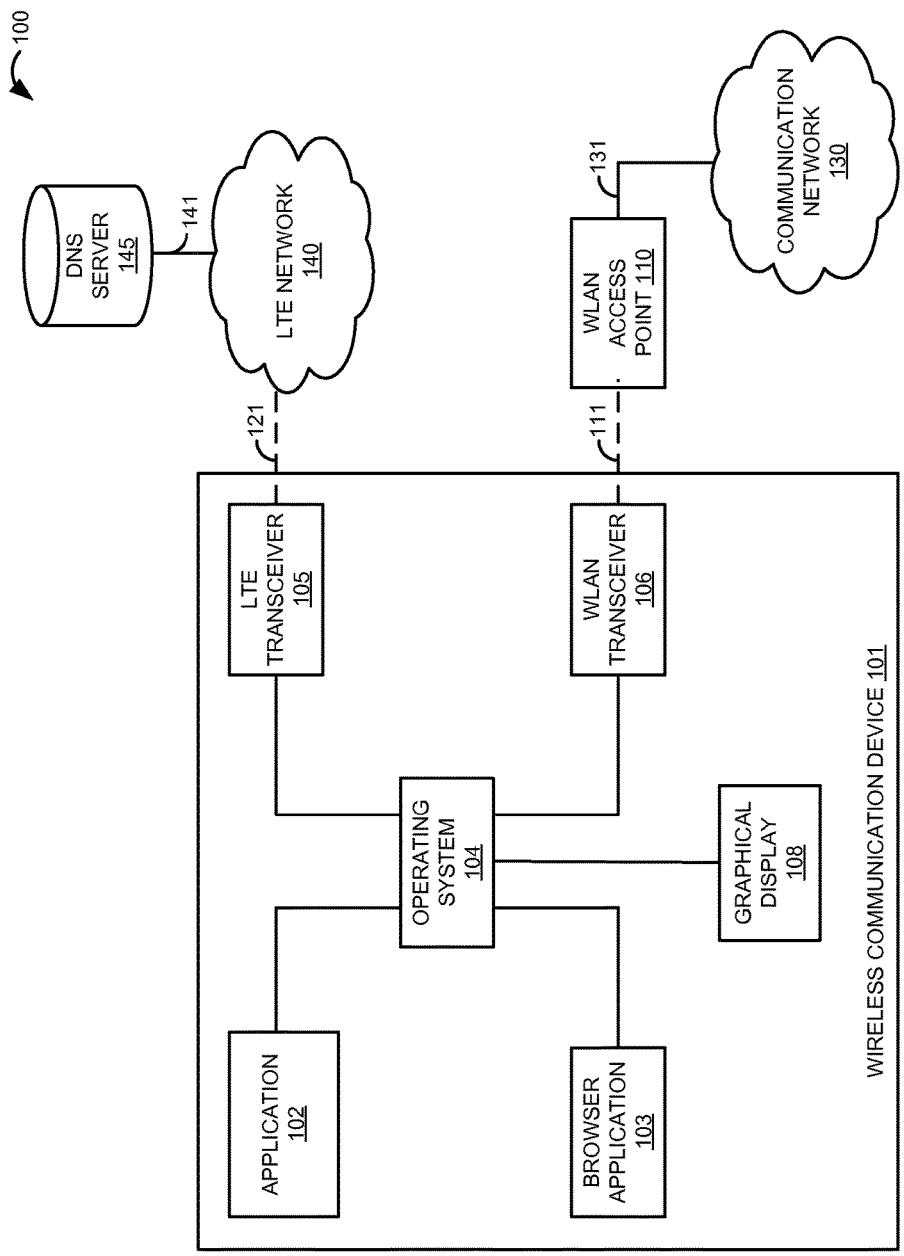
FIG. 1 is a block diagram that illustrates a communication system.

FIG. 1 is a block diagram that illustrates communication system 100. Communication system 100 includes wireless communication device 101, wireless local area network (WLAN) access point 110, communication network 130, long term evolution (LTE) network 140, and domain name system (DNS) server 145. Wireless communication device 101 includes application 102, browser application 103, operating system 104, LTE transceiver 105, WLAN transceiver 106, and graphical display 108. WLAN transceiver 106 and WLAN access point 110 are in communication over wireless communication link 111. WLAN access point 110 and communication network 130 are in communication over communication link 131. LTE transceiver 105 and LTE network 140 are in communication over wireless communication link 121. LTE network 140 and DNS server 145 are in communication over communication link 141. Note that LTE transceiver 105 and WLAN transceiver 106 may communicate using completely independent and discrete antenna elements, but may also share the same physical antenna elements or at least portions thereof in some examples.

Figure 2:
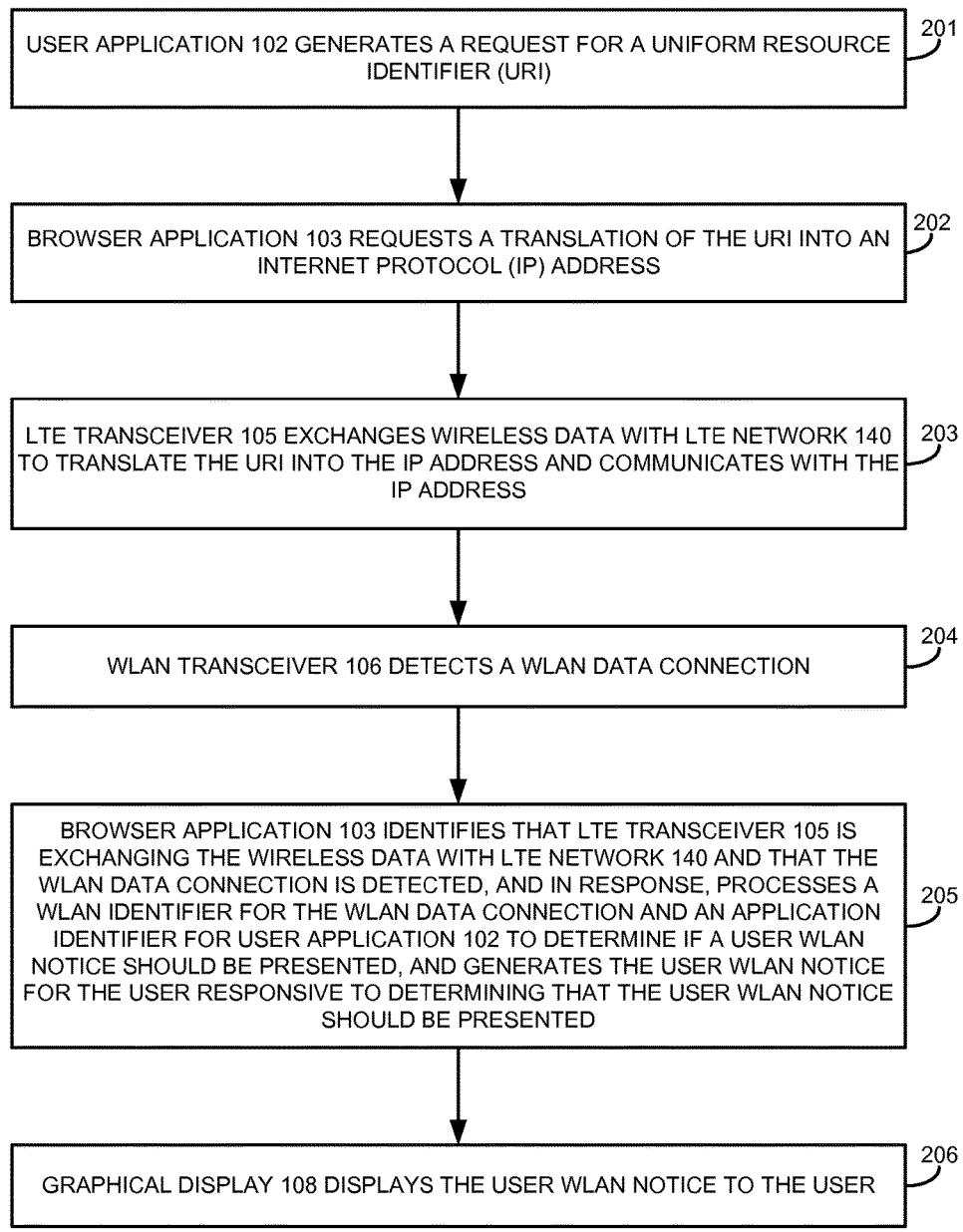
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless communication device 101 to facilitate directing user applications to use wireless local area network (WLAN) data connections.

As shown in the operational flow of FIG. 2, user application 102 generates a request for a uniform resource identifier (URI) (201). User application 102 could comprise any software application that executes on wireless communication device 101. For example, user application 102 could comprise a streaming media application, video application, audio application, news client, gaming application, sports application, social media application, web browser, messaging application, or any other software application—including combinations thereof. Typically, the URI describes a resource accessible remotely over a network, such as communication network 130 and/or LTE network 140. For example, the URI could comprise a domain name of a website, a name associated with a data server, or any other name associated with a network resource. The application request is typically generated by user application 102 in response to some user input, such as a user launching application 102, clicking a link presented by application 102, entering the URI into a form field, such as a browser address bar, or responsive to any other user request. The application request could be generated by user application 102 automatically in some examples, including in response to a request from another application (not shown). In some examples, user application 102 could generate the request for the URI and browser application 103 could be launched or spawned to handle the request.

Browser application 103 requests a translation of the URI into an internet protocol (IP) address (202). Typically, browser application 103 requests the translation of the URI into the IP address responsive to a user request or a call from application 102, operating system 104, or some other process—including combinations thereof. In some examples, operating system 104 utilizes browser application 103 to communicate with DNS server 145 over LTE network 140 to handle URI translation requests made by user application 102. User application 102 and browser application 103 could comprise the same application in some examples.

LTE transceiver 105 exchanges wireless data with LTE network 140 to translate the URI into the IP address and communicates with the IP address (203). Typically, operating system 104 includes a driver for LTE transceiver 105 which is used to direct LTE transceiver 105 to exchange the wireless data with LTE network 140. In some examples, LTE transceiver 105 transmits the URI over LTE network 140 to communicate a request for delivery to DNS server 145 to translate the URI into the IP address. The IP address could be associated with a video over IP session, voice over IP (VoIP) communication session, voice over LTE (VoLTE) communication session, audio over IP (AoIP), and other types of communication sessions in some examples. Once LTE transceiver 105 receives the IP address of the URI, LTE transceiver 105 may be utilized to communicate with the resource associated with the IP address over LTE network 140.

WLAN transceiver 106 detects a WLAN data connection (204). In this example, the WLAN data connection is provided by WLAN access point 110, although other WLAN data connections could be detected by WLAN transceiver 106 in other examples. WLAN transceiver 106 detects the WLAN data connection by receiving data transmitted from WLAN access point 110, such as a service set identifier (SSID) or some other connection availability information broadcast by WLAN access point 110. It should be understood that although the term WLAN is used herein, transceiver 106 could comprise a personal area network (PAN) communication transceiver capable of detecting a PAN data connection in some examples.

Browser application 103 identifies that LTE transceiver 105 is exchanging the wireless data with LTE network 140 and that the WLAN data connection is detected (205). There are several ways that browser application 103 could identify that LTE transceiver 105 is exchanging the wireless data with LTE network 140 and that the WLAN data connection is detected. Typically, operating system 104 will inform browser application 103 that LTE transceiver 105 is exchanging wireless data with LTE network 140 and that the WLAN data connection is detected, which could be provided to browser application 103 automatically by operating system 104, periodically by operating system 104, responsive to a request or requests from browser application 103, or responsive to some other event—including combinations thereof. Browser application 103 could control and/or have access to an IP stack and could identify that LTE transceiver 105 is exchanging wireless data with LTE network 140 and/or that the WLAN data connection is detected by examining the stack. In some examples, browser application 103 could have access to LTE transceiver 105 and/or WLAN transceiver 106, enabling browser application 103 to monitor their associated communications to identify that LTE transceiver 105 is exchanging wireless data with LTE network 140 and that the WLAN data connection is detected. Other techniques for browser application 103 to identify that LTE transceiver 105 is exchanging the wireless data with LTE network 140 and that the WLAN data connection is detected are possible and within the scope of this disclosure.

In response to identifying that LTE transceiver 105 is exchanging the wireless data with LTE network 140 and that the WLAN data connection is detected, browser application 103 processes a WLAN identifier for the WLAN data connection and an application identifier for user application 102 to determine if a user WLAN notice should be presented (205). In some examples, the WLAN identifier could comprise a service set identifier (SSID), numerical pairing code, equipment identifier, or some other information that identifies the WLAN data connection. The application identifier for user application 102 could comprise any data that browser application 103 may use to identify user application 102, including a handle, process identifier, application name, version number, or any other information associated with user application 102. Browser application 103 processes the WLAN identifier and the application identifier to determine if a user WLAN notice should be presented, which could involve browser application 103 referring to predetermined rules for the WLAN data connection and/or user application 102 in order to make this determination. For example, browser application 103 could determine to present a user WLAN notice based on a list of application identifiers and/or WLAN identifiers, such as whitelists where inclusion thereon direct browser application 103 to determine to present the user WLAN notice and blacklists where inclusion thereon direct browser application 103 to determine not to present the user WLAN notice. Other techniques for browser application 103 to process the WLAN identifier and the application identifier to determine if a user WLAN notice should be presented are possible and within the scope of this disclosure. In some examples, other context data, such as the IP address associated with the URI, a location of wireless communication device 101, and a location of WLAN access point 110, among others, could be processed by browser application 103 additionally or alternatively to the WLAN identifier and the application identifier to determine if a user WLAN notice should be presented. It should be understood that in various examples, browser application 103 could process one or more of the WLAN identifier, the application identifier, the URI, the IP address associated with the URI, a location of wireless communication device 101, and a location of WLAN access point 110 to determine if a user WLAN notice should be presented.

Browser application 103 generates the user WLAN notice for the user responsive to determining that the user WLAN notice should be presented (205). The user WLAN notice generated by browser application 103 typically informs a user of wireless communication device 101 of the availability of the detected WLAN data connection. Graphical display 108 then displays the user WLAN notice to the user (206). In some examples, the user WLAN notice may suggest to the user to switch to the WLAN data connection so that wireless communication device 101 may cease exchanging the wireless data with LTE network 140. The user WLAN notice may prompt the user for authorization to switch to the WLAN data connection, and may include information associated with the WLAN data connection in some examples, such as the WLAN identifier, SSID, wireless signal strength, password for the WLAN data connection, and other information associated with the WLAN data connection. The user WLAN notice could also include information associated with user application 102, such as the application identifier, name of the application, an amount of data usage historically and/or currently being consumed by the application, and any other information associated with user application 102. In some examples, the user WLAN notice could also include information associated with the LTE data connection between LTE transceiver 105 and LTE network 140, such as a received signal strength indicator (RSSI), base station identifier, an amount of LTE data usage of a subscriber account associated with wireless communication device 101, an amount of the wireless data that LTE transceiver 105 has exchanged with LTE network 140, a connection speed of the LTE data session, bandwidth information, and any other information associated with the LTE data connection between LTE transceiver 105 and LTE network 140. It should be understood that the user WLAN notice is not limited solely to the information described above, but browser application 103 could include other relevant information and features when generating the user WLAN notice for display on graphical display 108.

In some examples, wireless communication device 101 and/or browser application 103 could be configured to receive a user decision in response to the user WLAN notice, process context data associated with the user decision to generate decision criteria for the user decision, and automatically apply the user decision when the decision criteria is satisfied. In this manner, the user will not be presented with a user WLAN notice when wireless communication device 101 is being operated in the same context in the future as defined by the decision criteria, but instead will automatically apply the user decision for this situation as previously received from the user. In some examples, the context data used to generate the decision criteria for the user decision could comprise the IP address, the application identifier, the WLAN identifier for a WLAN data connection, a location of wireless communication device 101, and any other contextually-relevant information—including combinations thereof.

Advantageously, when browser application 103 identifies that LTE transceiver 105 is exchanging wireless data with LTE network 140 and that the WLAN data connection is detected, browser application 103 processes a WLAN identifier for a WLAN data connection and an application identifier for user application 102 to determine whether or not a user WLAN notice should be presented to the user on graphical display 108. When presented, the user WLAN notice may inform a user of wireless communication device 101 of the availability of a detected WLAN data connection, and may suggest to the user to switch to the WLAN data connection so that wireless communication device 101 may cease exchanging the wireless data with LTE network 140. In this manner, the user of wireless communication device 101 is encouraged to switch to the WLAN data connection, thereby conserving bandwidth and other system resources on LTE network 140 and improving the experience of the user.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. In this example, wireless communication device comprises LTE transceiver 105 and WLAN transceiver 106. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, tablet, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and a communication network.

WLAN access point 110 comprises RF communication circuitry and an antenna. The RF communication circuitry typically includes an amplifier, filter, RF modulator, and signal processing circuitry. WLAN access point 110 may also comprise a router, modem, server, memory device, software, processing circuitry, cabling, power supply, network communication interface, structural support, or some other communication apparatus. WLAN access point 110 could comprise a base station, Internet access node, telephony service node, wireless data access point, femtocell, or some other wireless communication system—including combinations thereof. Some examples of WLAN access point 110 include a Wi-Fi hot spot, wireless access point (WAP), wireless router, Bluetooth device, and others—including combinations thereof. Wireless network protocols that may be utilized by WLAN access point 110 include Wi-Fi, Bluetooth, Internet, telephony, or some other communication format—including combinations thereof.

Communication network 130 comprises the core network of a communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

LTE network 140 comprises the core network of a wireless communication service provider, and could include routers, gateways, telecommunication switches, servers, processing systems, or other communication equipment and systems for providing communication and data services. LTE network 140 could comprise wireless communication nodes, telephony switches, Internet routers, network gateways, computer systems, communication links, or some other type of communication equipment—including combinations thereof. LTE network 140 may also comprise optical networks, ATM networks, packet networks, RAN, LAN, MAN, WAN, or other network topologies, equipment, or systems—including combinations thereof. LTE network 140 may be configured to communicate over metallic, wireless, or optical links—including combinations thereof. LTE network 140 may be configured to use TDM, IP, Ethernet, optical networking, wireless protocols, including 4G LTE and LTE Advanced wireless protocols, communication signaling, or some other communication format—including combinations thereof. In some examples, LTE network 140 includes further access nodes and associated equipment for providing communication services to many wireless communication devices across a large geographic region.

DNS server 145 comprises a processing system and communication transceiver. DNS server 145 may also include other components such as a router, server, data storage system, and power supply. DNS server 145 may reside in single devices or may be distributed across multiple devices. DNS server 145 may be a discrete system or may be integrated within other systems—including other systems within communication system 100. In some examples, DNS server 145 could comprise a database system, session initiation protocol (SIP) server, voice over internet protocol (VoIP) gateway, VoIP control switch, authentication, authorization, and accounting (AAA) server, softswitch, home agent, packet data serving node (PDSN), network switch, mobile switching center, router, switching system, packet gateway, network gateway system, Internet access node, application server, service node, firewall, or some other communication system—including combinations thereof.

Wireless communication links 111 and 121 use the air or space as the transport medium. Wireless communication links 111 and 121 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 121 may individually comprise many different signals sharing the same link. For example, wireless communication links 111 and 121 could each include multiple signals operating in a single propagation path comprising multiple communication sessions, frequencies, timeslots, transportation ports, logical transportation links, network sockets, IP sockets, packets, or communication directions—including combinations thereof.

Communication links 131 and 141 may use metal, air, space, optical fiber such as glass or plastic, or some other material as the transport medium—including combinations thereof. Communication links 131 and 141 could use various communication protocols, such as TDM, IP, Ethernet, telephony, optical networking, hybrid fiber coax (HFC), communication signaling, wireless protocols, or some other communication format—including combinations thereof. Communication links 131 and 141 may be direct links or could include intermediate networks, systems, or devices.

Figure 3:
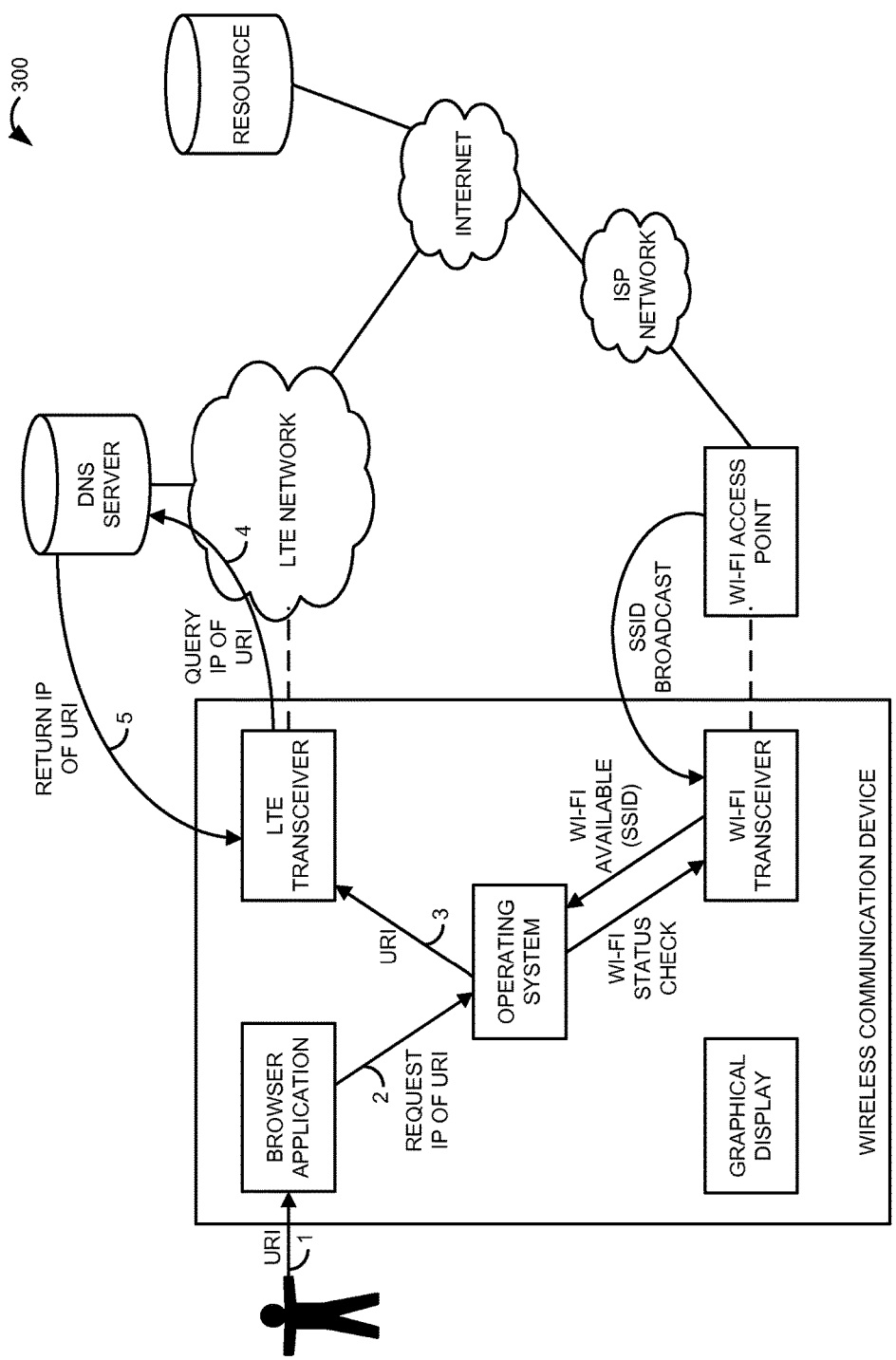
FIG. 3 is a block diagram that illustrates a communication system along with an operation of the communication system in an exemplary embodiment.

FIG. 3 is a block diagram that illustrates communication system 300 along with an operation of communication system 300 in an exemplary embodiment. Communication system 300 includes a wireless communication device having a browser application and an operating system executing thereon. The wireless communication device includes an LTE transceiver, a Wi-Fi transceiver, and a graphical display. Communication system 300 also includes a Wi-Fi access point, internet service provider (ISP) network, LTE network, DNS server, and a resource accessible over the internet via an IP address assigned to the resource.

In operation, the operating system executing on the wireless communication device performs a Wi-Fi status check by directing the Wi-Fi transceiver to scan for service set identifiers (SSIDs) broadcast by available Wi-Fi networks. The operating system may perform this Wi-Fi status check automatically and/or periodically, or in response to a request to check for available Wi-Fi networks received from the browser application or one of a plurality of user applications executing on the wireless communication device (not shown). In this example, the Wi-Fi access point broadcasts its SSID which is detected by the Wi-Fi transceiver of the wireless communication device, and the Wi-Fi transceiver informs the operating system of the SSID of the available Wi-Fi access point.

The numerical designations of 1 through 5 on the arrows describe an operational flow of FIG. 3 and are indicated below parenthetically. In operation, the browser application executing on the wireless communication device receives a user request to access a uniform resource identifier (URI) associated with the resource shown in FIG. 3 (Step 1). The user request to access the URI could be provided to the web browser directly through user input, such as the user entering the URI into an address bar of the browser or clicking a hyperlink of the URI on a webpage presented by the browser, or indirectly by request from a user application or the operating system. For example, the user could provide input into a user application executing on the wireless communication device to cause the user application to launch the browser for accessing the URI.

The browser application receives the URI and requests a translation of the URI into an IP address for the resource (Step 2). The browser application provides the URI translation request to the operating system. In this example, the wireless communication device is registered with the LTE network and exchanging LTE data communications with the LTE network using the LTE transceiver. The operating system therefore provides the URI to the LTE transceiver and directs the LTE transceiver to query for the IP address of the URI (Step 3). The LTE transceiver is driven by the operating system to request the IP address of the URI from a DNS server via the LTE network (Step 4). The DNS server responds to the query by returning the IP address of the resource associated with the URI (Step 5). The operation of FIG. 3 is continued in FIG. 4.

Figure 4:
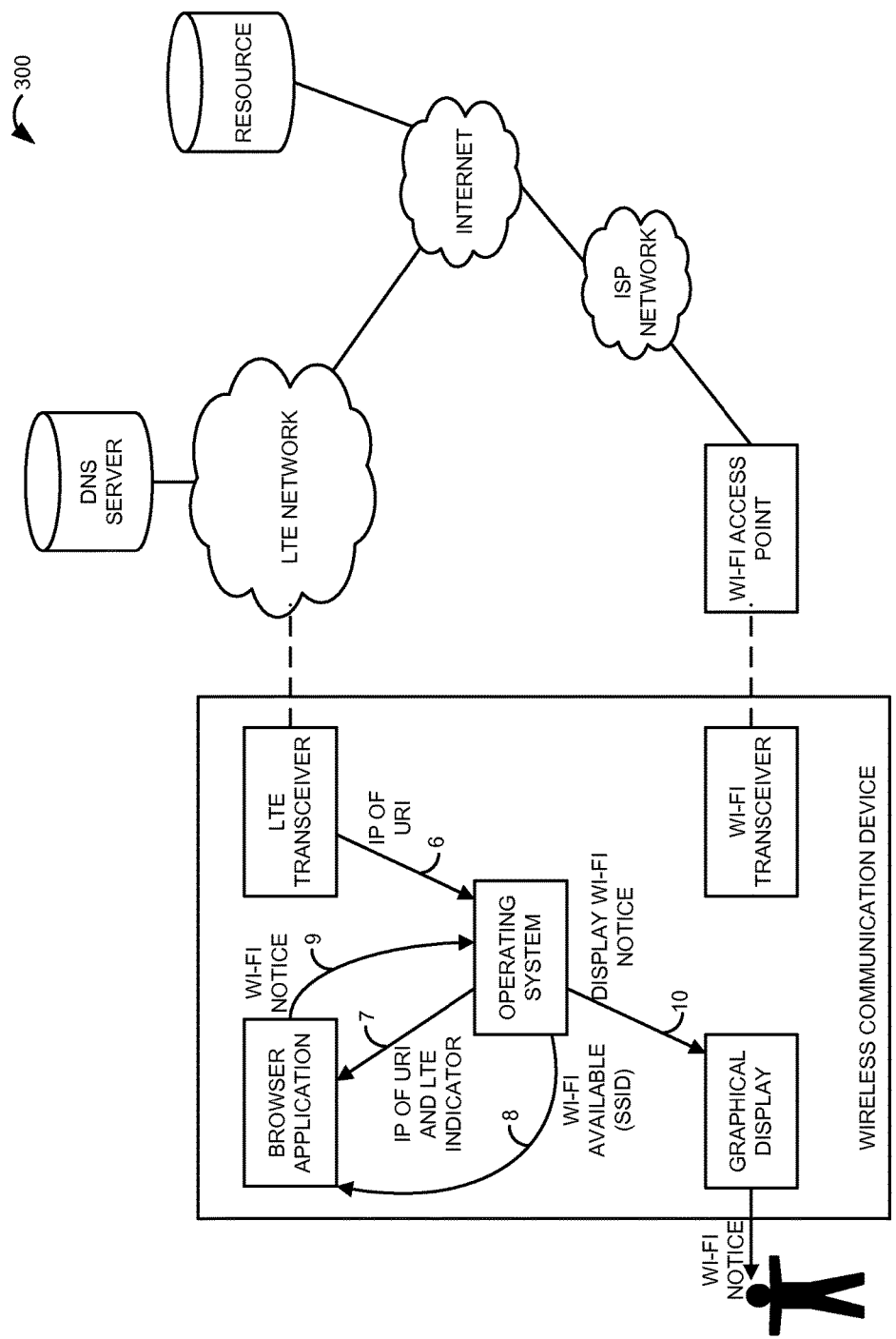
FIG. 4 is a block diagram that illustrates the communication system of FIG. 3 along with a continuation of the operation of FIG. 3 in an exemplary embodiment.

FIG. 4 is a block diagram that illustrates communication system 300 of FIG. 3 along with a continuation of the operation of FIG. 3 in an exemplary embodiment. The numerical designations of 6 through 10 on the arrows describe the operational flow that is continued in FIG. 4. The description of the operational flow left off in FIG. 3 with the DNS server responding to a query for the IP address of the URI associated with the resource. Continuing this operation in FIG. 4, the LTE transceiver receives the IP address associated with the URI from the DNS server via the LTE network and provides the IP address to the operating system (Step 6). The operating system provides the IP address of the URI and an LTE indicator to the browser application in response to the request for the translation of the URI into the IP address requested by the browser application (Step 7). The LTE indicator is provided by the operating system to the browser application to indicate to the browser that the wireless communication device is presently engaged in an LTE communication session with the LTE network using the LTE transceiver. The operating system also provides a Wi-Fi availability notification to the browser application with the SSID of the Wi-Fi access point that is within range of the wireless communication device as detected by the Wi-Fi transceiver (Step 8). It should be understood that the operating system may provide the LTE indicator and the Wi-Fi availability notice to the browser application automatically and/or periodically, or in response to a request for this information issued by the browser application, and that the operating system may provide this information to the browser application at any time before or during the operational flow described in FIGS. 3 and 4.

After the browser application receives the IP address associated with the URI, the LTE indicator, and the Wi-Fi availability notice, the browser application processes this information to determine if a Wi-Fi notice should be generated for presentation to the user of the wireless communication device. The browser application could base this determination on several factors, all of which could be fully customized by the user by entering preferences into configuration settings of the browser application. In some examples, the browser application may check if the IP address, the URI, and/or a user application that launched the URI is included in a whitelist, where inclusion on the list directs the browser application to generate a Wi-Fi notice that prompts the user for permission to switch from the LTE connection to the Wi-Fi connection. A blacklist could also be utilized that directs the browser application to not generate the Wi-Fi notice if the IP address, URI, and/or a user application that launched the URI is included thereon.

Metrics associated with the available Wi-Fi data connection could also be considered by the browser application when determining whether or not to generate a Wi-Fi notice for presentation to the user of the wireless communication device. For example, the browser application could be configured to generate the Wi-Fi notice based on a security status of the available Wi-Fi connection, such as when the Wi-Fi network is open and unencrypted or when the Wi-Fi network is secure. The level of security of the available Wi-Fi connection could also be considered, such as wired equivalent privacy (WEP), Wi-Fi protected access (WPA), and other security algorithms that may be used to secure the Wi-Fi network. In some examples, the browser application may be configured to only present a notification of the available Wi-Fi connection if the user has previously accessed the Wi-Fi network and/or has previously stored a password for a secure Wi-Fi connection, so as not to bother the user with notifications of secured Wi-Fi connections that the user is not authorized to access. The browser could track this history by maintaining whitelists and blacklists of Wi-Fi connections to aid in this determination, indexed by the SSID of the Wi-Fi connections along with a location indicator in some examples. The location indicator could be used by the browser application to distinguish between Wi-Fi connections having the same SSID, and could be derived from global positioning system (GPS) data, an identifier of the eNodeB base station the wireless communication device is presenting communicating with on the LTE network, a centroid of a sector provided by the eNodeB serving the wireless communication device, triangulation, trilateration, or any other technique of determining the location of the wireless communication device. As discussed above, the user of the wireless communication device is able to customize the behavior of the browser application by providing user Wi-Fi notification settings that direct the browser application to present a Wi-Fi availability notice based on the presence or absence of any of the above considerations.

Information associated with the LTE data connection may also be used to determine whether to generate the user Wi-Fi notice. For example, the signal strength of the wireless signal of the LTE data connection could be a condition for whether or not the browser application generates the Wi-Fi notice for presentation to the user, such as generating the notice if the signal strength of the LTE connection falls below a predetermined threshold value. A carrier, data type, bandwidth, connection speed, and other aspects of the LTE data connection being used by the wireless communication device may also be considered by the browser application when determining whether to generate the user Wi-Fi notice; any of which could be compared to threshold values to aid in this determination. A roaming status of the LTE data connection could also be a factor in determining whether to generate the Wi-Fi notice. For example, the browser application could be configured to generate the notice if the LTE data connection is roaming on a visited wireless network that is operated by a different service provider than a home wireless network subscribed to by the user. Whitelists and blacklists could also be used by the browser with respect to these LTE data connection metrics to aid in the decision to generate a Wi-Fi notice for the user, indexed by base station identifiers, sector identifiers, location information, or any other data that may be used to distinguish different LTE data connections. For example, whenever the wireless communication device is utilizing an LTE data connection included on the whitelist, the browser application could be configured to generate the Wi-Fi notice for presentation to the user, provided any other factors that the browser application has been configured to consider when making this determination are also met.

The browser application could also be configured to factor in time-based metrics to determine whether to generate the user Wi-Fi notice for presentation to the user. For example, the browser could be configured to only present a user Wi-Fi notice during predetermined times of the day and/or days of the week. Additionally, the browser application may utilize timers to dictate when the user Wi-Fi notice should be presented to the user, such as waiting a predetermined number of minutes before presenting the notification of an available Wi-Fi connection to the user. For example, the browser application may start a timer once the user begins receiving data from the IP address of the resource identified by the URI over the LTE data connection, and would prompt the user to switch to the available Wi-Fi connection after some amount of time has elapsed. In some examples, if the browser application generates and presents the Wi-Fi notice to the user and the user elects to stay on the LTE data connection, the browser application could be configured to present the Wi-Fi notice to the user again after a predetermined amount of time has elapsed after receiving the user decision in response to the first Wi-Fi notice presented to the user.

The browser application processes any or all of the above factors to determine whether or not to generate a user Wi-Fi notice for presentation to the user, which is typically based on the configuration settings and preferences defined by the user. However, some or all of the behavior of the browser application could be predetermined programmatically by a third party, such as a manufacturer of the wireless communication device, a communication service provider that provides access to the LTE network, an author of the browser application, or any other third party entity. After the browser application generates the Wi-Fi notice, the browser application provides the Wi-Fi notice to the operating system for presentation to the user (Step 9). The operating system drives the graphical display of the wireless communication device to display the Wi-Fi notice to the user (Step 10). The user is then prompted with the Wi-Fi notice indicating the availability of the Wi-Fi data connection.

The user Wi-Fi notice presented to the user could include various information, such as the SSID of the available Wi-Fi network, the signal strength of a wireless signal detected from the Wi-Fi network, the URI, the IP address, the name of an application that launched the URI, and other related information. In some examples, the user Wi-Fi notice could also display metrics related to the LTE data connection presently being utilized by the wireless communication device, such as the connection speed, wireless signal strength, available bandwidth, amount of data usage that has already been consumed over the LTE network, and other information associated with the LTE data connection. The user Wi-Fi notice displayed to the user provides the option to switch to the Wi-Fi connection or deny such permission in order to remain on the LTE network. The user Wi-Fi notice may also provide an option to deny permission to switch to the Wi-Fi network at the current time but to also remind the user of the Wi-Fi notice at a later time, and this later time could be specified by the user in some examples, such as by requesting the browser application to provide another notice in five minutes.

The user's decision may be stored by the browser application in a memory of the wireless communication device in some examples, so that the decision may be automatically applied by the browser in the future. The user Wi-Fi notice could include an option to add or remove the Wi-Fi connection to this list of approved connections. The list of approved Wi-Fi connections could specify that an approved Wi-Fi connection should always be used whenever it is available, regardless of the URI, IP address, or user application associated with the URI. In other examples, the list of approved Wi-Fi connections could specify that the Wi-Fi connection should be connected to automatically for the particular URI, IP address, and/or user application that the user has explicitly provided permission for to use. In some examples, the browser application could be configured to automatically apply the user decision whenever the wireless communication device is in the same situation or context as when the decision was made. For example, the wireless communication device could store the URI, IP address, user application that requested the URI, location of the wireless communication device, the SSID of the Wi-Fi connection, an identifier of the base station or sector of the LTE data connection, the time of day and day of week that the decision was made, and any other relevant context data associated with the user decision. The browser application could then process any or all of the above context data to generate decision criteria for the user decision, and automatically apply the user decision whenever the decision criteria is satisfied. For example, the decision criteria could specify that the browser application should automatically switch to the Wi-Fi connection whenever the wireless communication device is located within a one mile radius of the Wi-Fi access point and is communicating with the IP address associated with the URI using the LTE data connection. Any other combination of decision criteria based on the context of the situation when the user makes the user decision are possible and within the scope of this disclosure. In some examples, the user can also control the automatic application of previous decisions by providing configuration settings and preferences for when the browser application should automatically switch to the Wi-Fi connection.

Beneficially, the browser application prompts the user to switch to available Wi-Fi connections for particular URIs, IP addresses, and/or user applications. The browser application may also intelligently manage automatically switching to a Wi-Fi connection that the user previously decided to connect to by storing information related to the context of that decision, and identifying when a state of the wireless communication device complies with the same context as the time when the user made the decision. In this manner, the user is encouraged to utilize Wi-Fi data connections instead of LTE data connections for various URIs, IP addresses, user applications, and other data requests, thereby conserving bandwidth and system resources on the LTE network which may reduce the user's service bill and improve the user's experience.

Figure 5:
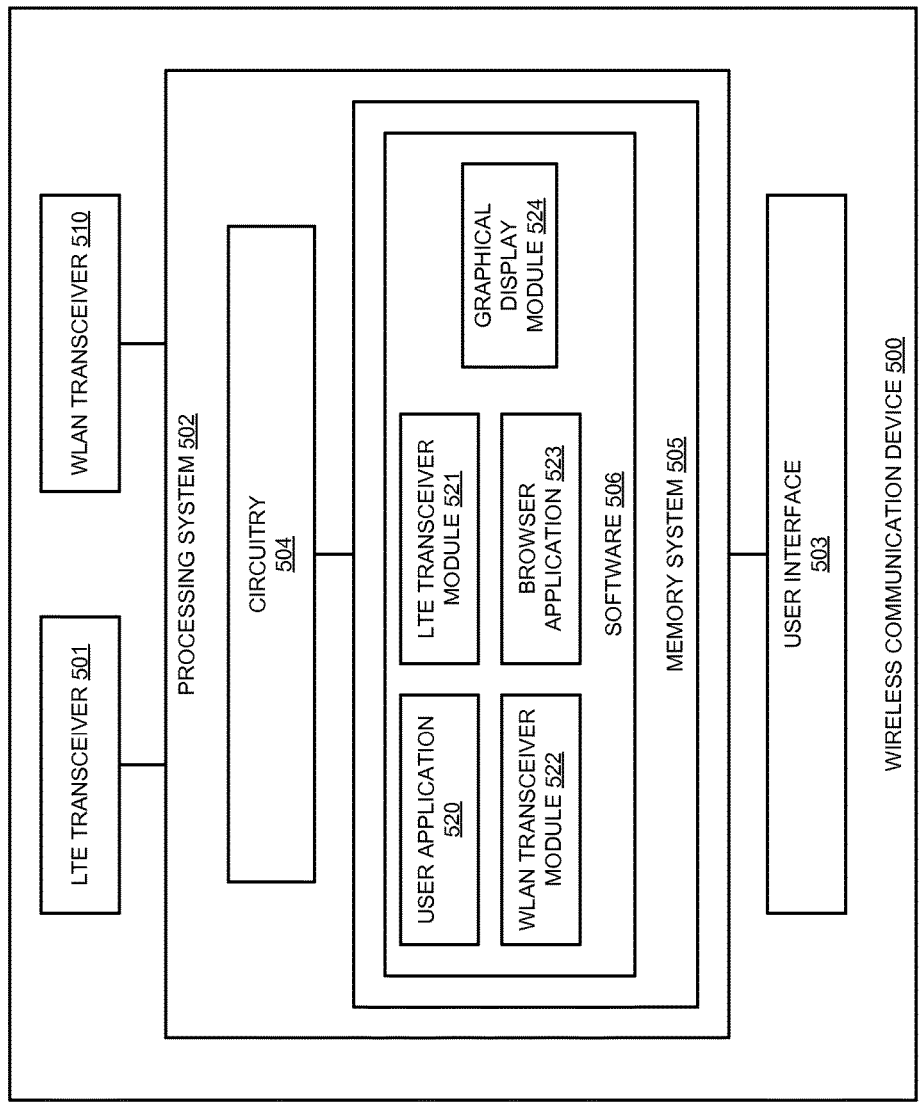
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises long term evolution (LTE) transceiver 501, processing system 502, user interface 503, and wireless local area network (WLAN) transceiver 510. Processing system 502 is linked to LTE transceiver 501, WLAN transceiver 510, and user interface 503. Processing system 502 includes processing circuitry 504 and memory system 505 that stores operating software 506. Operating software 506 comprises software modules 520-524. Wireless communication device 500 may include other well-known components such as a battery and enclosure that are not shown for clarity. Wireless communication device 500 may comprise a telephone, transceiver, mobile phone, cellular phone, smartphone, computer, PDA e-book, tablet, game console, mobile Internet device, wireless network interface card, media player, or some other wireless communication apparatus—including combinations thereof.

LTE transceiver 501 comprises RF communication circuitry and an antenna. The RF communication circuitry typically includes an amplifier, filter, RF modulator, and signal processing circuitry. LTE transceiver 501 may also include a memory system, software, processing circuitry, or some other communication device. LTE transceiver 501 may use various protocols, such as 3GPP LTE, LTE Advanced, Internet, telephony, or some other wireless communication format. In some examples, LTE transceiver 501 may be configured to exchange wireless data with an LTE network to translate a URI into an IP address and to communicate with the IP address.

WLAN transceiver 510 comprises RF communication circuitry and an antenna. In some examples, WLAN transceiver 510 may share at least a portion of communication components with LTE transceiver 501, such as the antenna. The RF communication circuitry typically includes an amplifier, filter, RF modulator, and signal processing circuitry. WLAN transceiver 510 may also include a memory system, software, processing circuitry, or some other communication device. WLAN transceiver 510 may use various protocols, such as Wi-Fi, Bluetooth, Internet, telephony, or some other wireless communication format. In some examples, WLAN transceiver 510 may be configured to detect one or more WLAN data connections.

User interface 503 comprises components that interact with a user to receive user inputs and to present media and/or information. User interface 503 may include a speaker, microphone, buttons, lights, graphical display, touchscreen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. Processing circuitry 504 is typically mounted on a circuit board that may also hold memory system 505 and portions of LTE transceiver 501, WLAN transceiver 510, and user interface 503. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 520-524, although software 506 could have alternative configurations in other examples.

When executed by processing circuitry 504, operating software 506 directs processing system 502 to operate wireless communication device 500 to facilitate directing user applications to use WLAN data connections as described herein for wireless communication device 101. In particular, operating software 506 directs processing system 502 to execute one of the user applications 520 to generate an application request for a uniform resource identifier (URI). Operating software 506 also directs processing system 502 to execute browser application 523 to request a translation of the URI into an internet protocol (IP) address. Operating software 506 further directs processing system 502 to direct LTE transceiver 501 to exchange wireless data with an LTE network to translate the URI into the IP address and to communicate with the IP address. Operating software 506 also directs processing system 502 to direct WLAN transceiver 510 to detect one of the WLAN data connections. In addition, operating software 506 directs processing system 502 to execute browser application 523 to identify that LTE transceiver 501 is exchanging the wireless data with the LTE network and that the one of the WLAN data connections is detected, and in response, process a WLAN identifier for the one of the WLAN data connections and an application identifier for the one of the user applications 520 to determine if a user WLAN notice should be presented. Operating software 506 further directs processing system 502 to execute browser application 523 to generate the user WLAN notice for the user responsive to determining that the user WLAN notice should be presented. Finally, operating software 506 directs processing system 502 to direct a graphical display of user interface 503 to display the user WLAN notice to the user.

In this example, operating software 506 comprises user application 520 that generates an application request for a uniform resource identifier (URI). Operating software 506 also comprises an LTE transceiver software module 521 that exchanges wireless data with an LTE network to translate the URI into the IP address and to communicate with the IP address. In addition, operating software 506 comprises a WLAN transceiver software module 522 that detects one of the WLAN data connections. Operating software 506 further comprises a browser application 523 that requests a translation of the URI into an IP address, identifies that LTE transceiver 501 is exchanging the wireless data with the LTE network and that the one of the WLAN data connections is detected, and in response, processes a WLAN identifier for the one of the WLAN data connections and an application identifier for the one of the user applications 520 to determine if a user WLAN notice should be presented, and generates the user WLAN notice for the user responsive to determining that the user WLAN notice should be presented. Finally, operating software 502 comprises a graphical display software module 524 that displays the user WLAN notice to the user.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device to control wireless communications for a user application, the wireless communication device comprising:

a Long Term Evolution (LTE) transceiver;
a Wi-Fi transceiver;
an internet browser;
the user application;
an operating system configured to serve the user application and the internet browser and to control the LTE transceiver and the Wi-Fi transceiver;
the internet browser configured to receive an indication of an active LTE network connection, a Service Set Identifier (SSID) of a Wi-Fi connection, and a Uniform Resource Indicator (URI);
the internet browser configured to process the indication of the active LTE network connection, the SSID of the Wi-Fi connection, and the URI to determine to exchange additional wireless data for the user application over a Wi-Fi network instead of an LTE network;
the internet browser configured to translate the URI into a user application identifier for the application, to store network data that associates the user application identifier with the Wi-Fi SSID, and to generate a user notice; and
the internet browser further configured to generate a user notice responsive to the detection of the user application exchanging the wireless data over the LTE network and the detection of the WLAN associated with the user application; and
the internet browser configured to receive a positive user response to the user notice and responsively direct the operating system to exchange the additional wireless data for the user application over the Wi-Fi network instead of the LTE network responsive to positive user response.

2. A method of operating a wireless communication device to control wireless communications for a user application, wherein the wireless communication device comprises a Long Term Evolution (LTE) transceiver, a Wi-Fi transceiver, an internet browser, the user application, and an operating system, and wherein the operating system serves the user application and the internet browser and controls the LTE transceiver and the Wi-Fi transceiver, the method comprising:

the internet browser receiving an indication of an active LTE network connection, a Service Set Identifier (SSID) of a Wi-Fi connection, and a Uniform Resource Indicator (URI);
the internet browser processing the indication of the active LTE network connection, the SSID of the Wi-Fi connection, and the URI to determine to exchange additional wireless data for the user application over a Wi-Fi network instead of an LTE network;
the internet browser translating the URI into a user application identifier for the application, storing network data that associates the user application identifier with the Wi-Fi SSID, and generating a user notice; and
the internet browser receiving a positive user response to the user notice and responsively directing the operating system to exchange additional wireless data for the user application over the Wi-Fi network instead of the LTE network responsive to positive user response.

* * * * *